United States Patent [19]

Habiger

[11] 4,094,145

[45] June 13, 1978

[54] UNDERSPEED ACTUATOR FOR A HYDROSTATIC TRANSMISSION HAVING A SHUNT VALVE

[75] Inventor: Cyril W. Habiger, Joliet, Ill.

[73] Assignee: Caterpillar Tractor Co., Peoria, Ill.

[21] Appl. No.: 807,277

[22] Filed: Jun. 16, 1977

[51] Int. Cl.² ............................................. F16H 39/46
[52] U.S. Cl. ........................................ 60/447; 60/449
[58] Field of Search .................. 60/447, 449, 488, 494

[56] References Cited

U.S. PATENT DOCUMENTS

| | | | |
|---|---|---|---|
| 3,054,263 | 9/1962 | Budzich et al. | 60/447 |
| 3,952,514 | 4/1976 | Habiger | 60/445 X |
| 3,952,515 | 4/1976 | Habiger et al. | 60/447 |

Primary Examiner—Edgar W. Geoghegan
Attorney, Agent, or Firm—John W. Grant

[57] ABSTRACT

An underspeed actuator has a piston connected to a control means of a first pump driven by a prime mover and is movable between a first position at which the first pump is at minimum displacement and a second position at which the first pump is at maximum displacement. The underspeed actuator has first and second actuating chambers at opposite ends of the piston and a biasing device urging the piston toward the first position. The piston is movable between the first and second positions in response to pressure differential in said first and second chambers. A signal device controllably develops first and second control signals in response to the operating speed of the prime mover. First and second conduits deliver said first and second control signals to said first and second chambers, respectively. A shunt valve is connected to the first and second conduits for passing fluid expelled from the first chamber to the second chamber in response to said flow of fluid exceeding a preselected flow rate.

4 Claims, 1 Drawing Figure

U.S.Patent     June 13, 1978     4,094,145
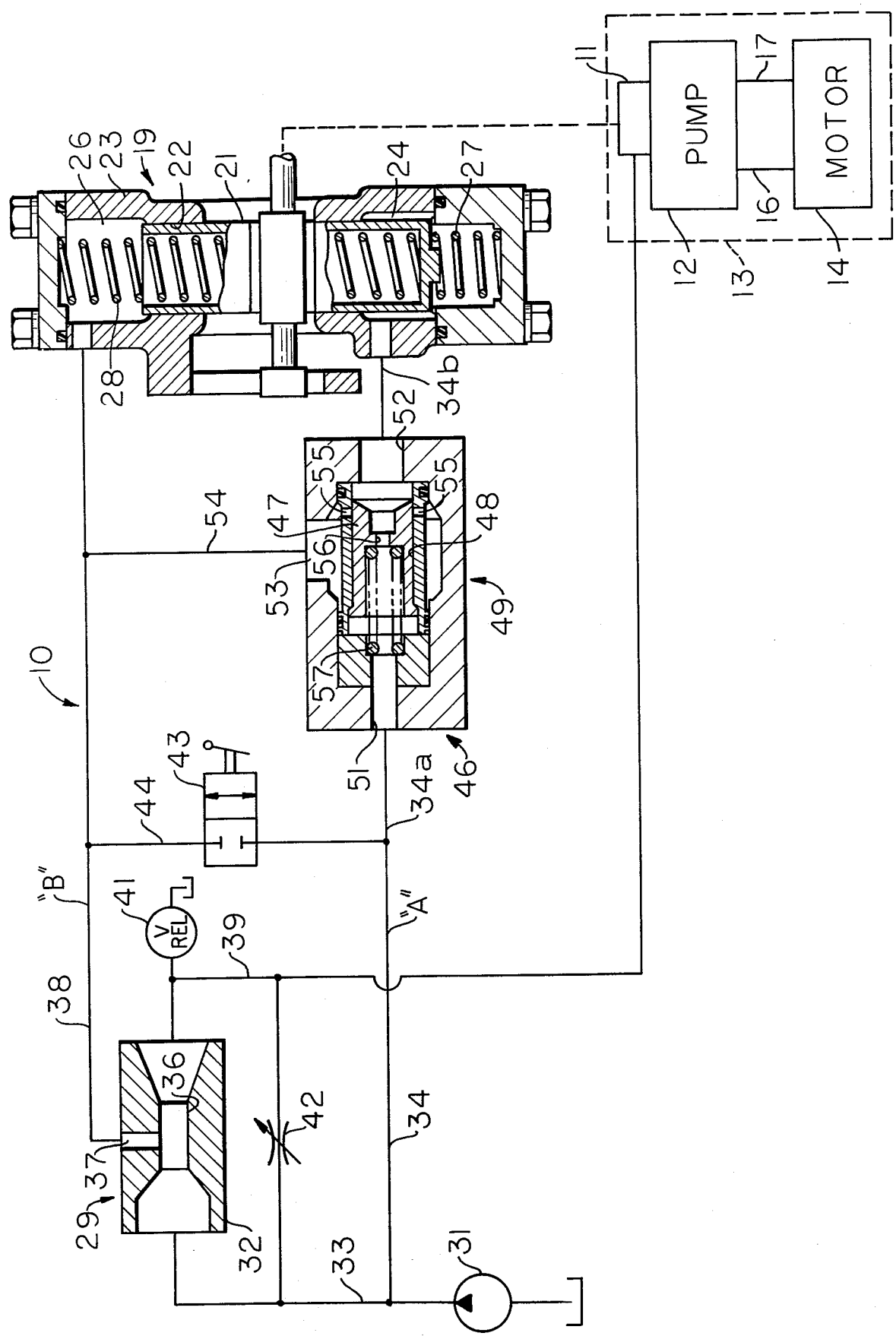

UNDERSPEED ACTUATOR FOR A HYDROSTATIC TRANSMISSION HAVING A SHUNT VALVE

BACKGROUND OF THE INVENTION

Many vehicles having hydrostatic transmissions also are provided with an underspeed actuator which functions to reduce the load on the engine by reducing the displacement of the pump of the hydrostatic transmission when the speed of the engine falls below a preselected speed range in response to an external load such as when the vehicle is operated uphill or otherwise encounters an increased load. One of the problems encountered with such underspeed actuators is that of providing rapid response thereof when a load is suddenly imposed on the hydrostatic transmission causing a sudden increase in the pump output pressure and a decrease in engine speed. It is desirable to provide means for rapid response of the underspeed acutator under such conditions to enable the engine to maintain a higher operating speed thereby improving performance and efficiency.

SUMMARY OF THE INVENTION

The present invention is directed to overcoming one or more of the problems as set forth above.

According to the present invention, a control system for controlling the displacement of a first pump driven by a prime mover has a control means for adjusting the displacement of said pump. An underspeed actuator has a piston, first and second actuating chambers at opposite ends of said piston and a biasing means. The piston is connected to the control means and movable between a first position at which said first pump is at minimum displacement and a second position at which said first pump is at maximum displacement. The biasing means urges the piston toward the first position. The piston is movable between the first and second positions in response to pressure differential in said first and second chambers. A signal means controllably develops first and second control signals in response to the operating speed of the prime mover. A first conduit delivers said first control signal to said first chamber and a second conduit delivers said second control signal to said second chamber. A shunt valve means connects the first and second conduits for passing fluid expelled from the first chamber to the second chamber in response to said flow of fluid expelled from the first chamber exceeding a preselected flow rate.

BRIEF DESCRIPTION OF THE DRAWING

The sole FIGURE is a diagrammatic view of the apparatus of this invention with portions shown in section.

DETAILED DESCRIPTION

Referring now to the drawing, a control system is generally indicated by the reference numeral 10 and is connected to a control means 11 of a variable displacement pump 12. The pump 12 is a component of a hydrostatic transmission 13 and is driven by an engine or prime mover, not shown. A drive motor 14 is connected to the pump through a closed hydraulic loop having first and second conduits 16 and 17.

An underspeed actuator 19 is mechanically connected to the control means 11 and includes a piston 21 slidably positioned within a bore 22 of a body 23. First and second fluid actuating chambers 24, 26 are positioned at opposite ends of the piston 21. First and second springs 27, 28 are positioned within the first and second chambers at opposite ends of the piston with the second spring being sized sufficiently to resiliently urge the piston to the position shown in the absence of fluid pressure in either of the chambers, when the fluid pressure in the chambers is equal, or when a pressure differential existing in the chambers is such that the combined force of the second spring 28 and force generated by the pressurized fluid in the second chamber 26 is greater than the force generated by the pressurized fluid in the first chamber 24 and the first spring 27.

For an understanding of the operation of the underspeed actuator 19 and its connection to the control means 11 of the pump 12, it will suffice to state that the piston 21 is movable between a first position at which the displacement of the pump 12 is adjusted to its minimum displacement and a second position at which the displacement of the pump is adjusted to its maximum displacement. As shown in the drawing, the piston is at its first position. The piston 21 is moved between the first and second positions in response to pressure differential existing between the first and second chambers 24, 26 as well as the force of the spring 28. The first and second positions of the piston 21 are also referred to as "full underspeed" and "zero underspeed", respectively.

A signal means 29 develops first and second control signals A, B at a pressure differential that is substantially proporational to the operating speed of the engine and delivers the first and second control signals to the first and second chambers 24, 26, respectively.

The signal means 29 can be, for example, a control pump 31 and a venturi 32. The control pump is driven by the engine to produce fluid flow proportional to the operating speed of the engine. The venturi 32 is connected to the control pump 31 through a pump output line 33. A first signal conduit 34 is connected to the pump output line and to the first actuating chamber 24. The venturi has a venturi throat 36 connected to the pump output line 33 and a low pressure port 37 positioned adjacent the venturi throat. A second signal conduit 38 connects the low pressure port 37 to the second chamber 26. A conduit 39 connects the venturi to the control means 11 of the pump 12. A relief valve 41 is connected to the conduit 39 and maintains a predetermined pressure within the first signal conduit 34 and the conduit 39.

A venturi bypass valve 42 is positioned in parallel to the venturi throat 36 for adjusting the fluid flow through the venturi throat. The venturi bypass valve is provided to fine-tune the signal means for providing a predetermined pressure drop between the first and second signal conduits 34, 38 at a preselected engine speed. Preferably, the bypass valve is adjusted so that when the engine speed is at high idle, the pressure differential between the first and second signal conduits 34, 38 is such that the higher fluid pressure in the first signal conduit and thus the first actuating chamber 24 is sufficient to overcome the second spring 28, thus shifting the piston 21 upwardly to its second position.

Preferably, a manually actuatable override valve 43 is positioned within a conduit 44 interconnecting the first and second signal conduits 34, 38. Selectively shifting the override valve to the left adjusts the pressure differential in the first and second chambers 24, 26 causing the piston 21 of the underspeed actuator 19 to move toward the first position.

The above described basic elements are all well known in the art.

A shunt valve means 46 is connected to the first and second conduits 34, 38 for shunting or passing fluid expelled from the first chamber 24 to the second chamber 26 in response to the flow of fluid expelled from the first chamber exceeding a preselected flow rate.

The shunt valve means 46 has a valve member 47 slidably positioned within a bore 48 of a housing assembly 49. The housing assembly is positioned within the first conduit 34 intermediate the first chamber 24 and the connection joint of conduits 34 and 44. A first port 51 of the housing is connected to the pump output line 33 through a portion 34a of the conduit 34. A second port 52 is connected to the first chamber 24 through another portion 34b of the conduit 34. A third port 53 is connected to the second conduit 38 and hence the second chamber 26 through a conduit 54 and a plurality of passages 55.

The valve member 47 is positioned in the pathway of the fluid flow between the signal means 29 and the first chamber 24 and has an orifice 56 which communicates fluid between the first and second ports 51, 52. The orifice is preferably sized establish a maximum preselected fluid flow rate between the first chamber 24 and the signal means 29. The valve member is movable between first and second positions. At the first position, fluid flow through the shunt valve means 46 between the first and second chambers 24, 26 is blocked and fluid at a flow rate below a preselected flow rate of the orifice 56 is communicated between the first chamber and the signal means 29. At the second position, fluid exhausted from the first chamber 24 is shunted to the second chamber 26. A spring 57 resiliently biases the valve member 47 to the first position.

In the operation of the control system of the present invention, the position of the piston 21 of the underspeed actuator 19 is controlled as a function of the pressure differential established in the first and second chambers 24, 26 by the signal means 29. As the transmission or vehicle encounters an increased load or increased restriction to movement sufficient to cause a decrease in the speed of the engine, the operating speed of the control pump also decreases with a resultant decrease of fluid flow through the venturi throat 36. Pressure is thus relatively increased in the low pressure port 37 and second conduit 38 and hence the second chamber 26. This increased pressure cooperates with the spring 28 to urge piston 21 downwardly generally in proportion to the amount of pressure increase within the second chamber. The downward movement of the piston causes fluid to be expelled from the first chamber 24.

When the load on the engine is increased gradually so that the flow rate of the fluid expelled from the first chamber 24 is less than the rated or preselected flow rate of the orifice 56, the expelled fluid passes through orifice 56 and back to the signal means 29 without moving the valve member 47 from its first position. However, if the load is increased suddenly causing a greater increase in the fluid pressure in the second conduit 38 and second chamber 26, the piston 21 is moved downwardly more rapidly causing the fluid to be expelled from the first chamber 24 at a greater flow rate. If the flow rate exceeds the preselected flow rate of the orifice 56, the valve member 47 is moved to the second position so that the fluid expelled from the first chamber 24 is shunted back to the second chamber 26 thereby allowing the piston 21 to more quickly respond to the sudden load and quickly reduce the displacement of the pump 12.

After a short duration, the valve member 47 will be urged to its first position by the spring 57. However, by this time the displacement of the pump 12 has been decreased sufficiently for the speed of the engine to stabilize and the pressure differential in the first and second conduits 34, 38 is adjusted by the venturi 32 and the underspeed actuator 19 resumes control of the displacement of the pump in the usual manner.

Other aspects, objects and advantages of this invention can be obtained from a study of the drawing, the disclosure and appended claims.

The embodiments of the invention in which an exclusive property or privilege is claimed are defined as follows:

1. In a control system for controlling the displacement of a first pump driven by a prime mover, comprising:
   control means for adjusting the displacement of said first pump;
   an underspeed actuator having a piston, first and second actuating chambers at opposite ends of said piston, and a biasing means, said piston being connected to the control means and movable between a first position at which said first pump is at minimum displacement and a second position at which said first pump is at maximum displacement, said biasing means urging the piston toward the first position and said piston being movable between said first and second positions in response to pressure differential in said first and second chambers;
   signal means for controllably developing first and second control signals in response to the operating speed of the prime mover, said signal means having a first conduit for delivering said first control signal to said first chamber and a second conduit for delivering said second control signal to said second chamber; and
   shunt valve means connected to the first and second conduits for passing fluid expelled from the first chamber to the second chamber in response to said flow of fluid expelled from the first chamber exceeding a preselected flow rate.

2. The control system of claim 1 wherein said shunt valve means includes a valve member movable between a first position at which fluid flow through the valve means between the first and second chambers is blocked and fluid at a flow rate below said preselected flow rate is communicated between the first chamber and the signal means, and a second position at which fluid expelled from the first chamber is passed to the second chamber.

3. The control system of claim 2 including an orifice in the valve member positioned in the fluid flow pathway between the signal means and the first chamber, said orifice being of a size sufficient to establish said preselected flow rate.

4. The control system of claim 3 including a spring biasing the valve member to the second position.

* * * * *